(12) United States Patent
Lerman et al.

(10) Patent No.: US 8,190,474 B2
(45) Date of Patent: May 29, 2012

(54) ENGAGEMENT-BASED COMPENSATION FOR INTERACTIVE ADVERTISEMENT

(75) Inventors: David Ross Lerman, New York, NY (US); Troy William Young, Mill Valley, CA (US); Matthew Allen Sanchez, San Francisco, CA (US)

(73) Assignee: SAY Media, Inc., San Francisco, CA (US)

( * ) Notice: Subject to any disclaimer, the term of this patent is extended or adjusted under 35 U.S.C. 154(b) by 872 days.

(21) Appl. No.: 12/209,062

(22) Filed: Sep. 11, 2008

(65) Prior Publication Data

US 2009/0012867 A1  Jan. 8, 2009

Related U.S. Application Data

(63) Continuation-in-part of application No. 11/781,830, filed on Jul. 23, 2007.

(60) Provisional application No. 60/820,077, filed on Jul. 21, 2006.

(51) Int. Cl.
*G06Q 30/00* (2012.01)
*G05B 19/418* (2006.01)

(52) U.S. Cl. .................... 705/14.41; 715/822

(58) Field of Classification Search ............. 715/822
See application file for complete search history.

(56) References Cited

U.S. PATENT DOCUMENTS

| | | | |
|---|---|---|---|
| 5,848,396 A | 12/1998 | Gerace | |
| 6,385,591 B1 | 5/2002 | Mankoff | |
| 6,553,178 B2 | 4/2003 | Abecassis | |
| 6,690,481 B1 | 2/2004 | Yeung et al. | |
| 6,834,372 B1 * | 12/2004 | Becker et al. | 715/234 |
| 7,028,001 B1 * | 4/2006 | Muthuswamy et al. | 705/14.73 |
| 7,133,837 B1 * | 11/2006 | Barnes, Jr. | 705/26.81 |
| 7,188,085 B2 | 3/2007 | Pelletier | |
| 7,213,005 B2 | 5/2007 | Mourad et al. | |
| 7,734,503 B2 * | 6/2010 | Agarwal et al. | 705/14.54 |
| 7,840,911 B2 * | 11/2010 | Milener et al. | 715/822 |
| 7,930,206 B2 * | 4/2011 | Koningstein | 705/14.4 |

(Continued)

FOREIGN PATENT DOCUMENTS

WO  9741673 A2  11/1997

(Continued)

OTHER PUBLICATIONS

The interactive living revolution. (Interactive Living).(interactive television still shows potential) Shaw, Russell Broadcasting & Cable , v 133 , n. 13 , p. 3A(8) Mar. 31 , 2003.*

*Primary Examiner* — John Weiss
*Assistant Examiner* — Victoria Vanderhorst
(74) *Attorney, Agent, or Firm* — SilverSky Group, LLC

(57) ABSTRACT

Systems and methods for dynamically sizing, structuring and operating advertisements that include a variety of content, including interaction prompts and other elements, which enable an engagement-based revenue generation model. According to one embodiment, a computer implemented method comprises storing advertising content, serving an XML file from an advertising server to an advertisement manager in order to control a player on a user computer, dynamically generating the advertisement through the player based on directions from the advertisement manager and the stored content, and tracking and reporting a user's engagement with the advertisement in order to determine compensation for the publisher.

35 Claims, 13 Drawing Sheets

U.S. PATENT DOCUMENTS

| | | |
|---|---|---|
| 2001/0052000 A1 | 12/2001 | Giacalone, Jr. |
| 2002/0067730 A1 | 6/2002 | Hinderks et al. |
| 2002/0078456 A1 | 6/2002 | Hudson et al. |
| 2003/0117433 A1 | 6/2003 | Milton et al. |
| 2004/0015398 A1 | 1/2004 | Hayward |
| 2005/0137958 A1 | 6/2005 | Huber et al. |
| 2005/0267813 A1 | 12/2005 | Monday |

FOREIGN PATENT DOCUMENTS

| | | |
|---|---|---|
| WO | 200038428 A1 | 6/2000 |
| WO | 200203706 A1 | 1/2002 |

* cited by examiner

ENGAGEMENT-BASED COMPENSATION FOR INTERACTIVE ADVERTISEMENT

CROSS-REFERENCE TO RELATED APPLICATIONS

This application is a continuation-in-part of and claims priority to U.S. application Ser. No. 11/781,830 entitled "Systems and Methods for Interaction Prompt Initiated Video Advertising," filed on Jul. 23, 2007, which takes priority from provisional patent application Ser. No. 60/820,077, filed Jul. 21, 2006, which are incorporated herein by reference. This application is related to co-pending U.S. patent application No. 12/209,138, filed Sep. 11, 2008, titled "INTERACTION PROMPT FOR INTERACTIVE ADVERTISING"; U.S. patent application Ser. No. 12/209,126, filed Sep. 11, 2008, titled "INTERACTIVE ADVERTISING"; and U.S. patent application Ser. No. 12/209,107, filed Sep. 11, 2008, titled "DYNAMIC CONFIGURATION OF AN ADVERTISEMENT".

BRIEF DESCRIPTION OF THE INVENTION

The present invention is directed to computer-based systems and methods for dynamically sizing, structuring and operating advertisements that include a variety of content, including interaction prompts and other elements, which enable an engagement-based revenue generation model.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Traditional Internet or World Wide Web marketing/advertising operates on a "pay per impression" (PPI) basis. PPI is mostly used in association with banner advertising, where an advertiser pays a small amount to a website, advertising network, or other advertising reseller or aggregator (each a "publisher") each time the advertiser's advertisement is loaded into a user's web browser and displayed to the user (the "impression") by the publisher.

In addition to being paid by impression, publishers can also be paid if a user clicks on the banner advertisement (a "click through" event or "pay-per-click") and the user is directed to a website associated with the advertisement. Upon direction to the website, the advertiser becomes obligated to pay the publisher of that banner advertisement some amount of money for the referral. Many websites are completely funded through the mass collection of small payments from many different advertisers for both PPI and click through events.

In the same manner that advertising has changed over time, so too has the nature of the advertisements themselves. Many traditional advertisements have been static in nature, comprised of a picture and some text related to the subject matter being advertised. More recent advertisements have included multimedia object technologies (such as JAVA, SHOCKWAVE, FLASH, etc.) that utilize sound, video and/or animated content to grab a user's attention. Video advertising (whether live motion or animated) has frequently been used in association with other video content, such as playing a video commercial in association with a video trailer for a movie. Sometimes the video advertisement is displayed before the video content ("pre roll"), in the middle of the video content or a series of videos ("mid roll"), or after the video content ("post roll").

Whether the advertisement content is static or dynamic, the size of the advertisement is often limited to a set of predefined sizes by the publisher. For example, the standard wide and short, "full" banner advertisement, as established by the Interactive Advertising Bureau ("IAB"), is 468×60 pixels in size. The IAB has also set guidelines for other advertisement units, such rectangular and pop-up advertisements (336×280, 300×250, 250×250, 240×400 and 180×150), banner and button advertisements (728×90, 468×60, 234×60, 120×90, 120×60, 88×31, 80×15, 120×240 and 125×125), and skyscraper advertisements (120×600, 160×600 and 300×600). Rather than attempt to make all advertisement content fit every single advertisement unit, an advertiser will frequently generate advertisement content for use in just a couple of advertisement units, based on the sizes available, and force the publishers to fit that content into the space they have available on their websites. Publishers need a way to effectively select and arrange the multimedia content within an advertisement (including new forms of content) to fit many different advertisement units, as well as non-standard advertisement units, while maintaining the quality of the advertisement for the advertisers.

Likewise, while PPI advertising can initially be lucrative for a publisher, PPI has proven to be less effective over time because many users become overwhelmed with banner advertisements and begin to ignore them. For advertisers, this means that while they continue to pay for impressions, the value of such impressions is diluted due to the jaded nature of the users. While pay-per-click advertising addresses this issue for some direct-response oriented advertisers, many advertisers are just trying to build brand awareness rather than get users to their sites, so they are not interested in paying on a pay-per-click basis. Advertisers therefore need another method of measuring the effectiveness of an advertisement. The challenge is to develop an advertising system that forces greater accountability on those publishing advertisements to users and allows advertisers to more objectively measure the effectiveness of their advertisements on their intended audience.

DETAILED DESCRIPTION OF THE INVENTION

Although the present invention may be described in terms of various methods, the present invention also relates to apparatus for performing the operations herein. This apparatus may be specially constructed for the required purposes, or it may comprise a general-purpose computer selectively activated or reconfigured by a computer program stored in the computer. Such a computer program may be stored in any form of computer readable storage medium. Likewise, the methods described herein are not inherently related to any particular computer or other apparatus. Various general-purpose systems may be used with programs in accordance with the teachings herein, or specialized apparatus for performing the required method steps could be constructed.

Figure 1:
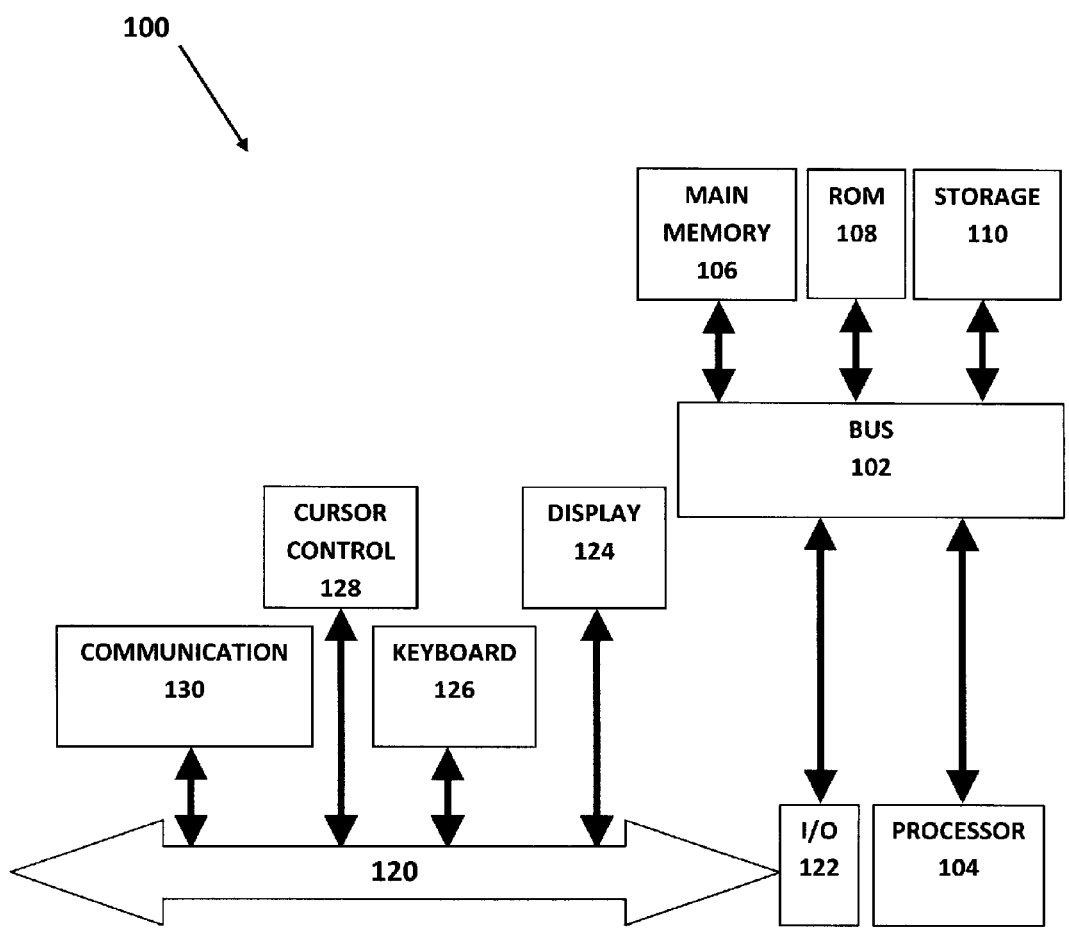
FIG. 1 illustrates an exemplary computer architecture for use with the present invention.

FIG. 1 illustrates a general-purpose computer system that could be utilized to implement the systems and methods of the present invention. The general computer architecture 100 depicted can be used to implement a user's computer, application servers, websites, advertisement managers, advertising servers, and other elements of the present invention that are presented in further detail below. One embodiment of architecture 100 comprises a system bus 102 for communicating information, and a processor 104 coupled to the bus 102 for processing information. Architecture 100 further comprises a random access memory (RAM) or other dynamic storage device 106 (referred to herein as main memory), coupled to the bus 102 for storing information and instructions to be executed by processor 104. Main memory 106 also may be used for storing temporary variables or other intermediate information during execution of instructions by processor 104. Architecture 100 also may include a read only memory (ROM) and/or other static storage devices 108 coupled to bus 102 for storing static information and instructions used by processor 104.

A data storage device 110 such as a magnetic disk or optical disc and its corresponding drive may also be coupled to the bus 102 for storing information and instructions. Architecture 100 can also be coupled to a second I/O bus 120 via an I/O interface 122. A plurality of I/O devices may be coupled to I/O bus 120, including a display device 124, an input device (e.g., a keyboard 126) and/or a cursor control device 128. The communication device 130 allows for access to other computers (servers or clients) via a network. The communication device 130 may comprise a modem, a network interface card, a wireless network interface or other well known interface device, such as those used for coupling to an Ethernet, token ring, or other type of network.

In general, the present invention relates to when a user accesses a website or other on-line location for displaying certain content on the user's computer (whether that computer is in the form of a desktop, laptop or other type of computing device, such as a personal digital assistance (PDA), a cellular phone, a smart phone or some other type of device) and the user is presented with that content, as well as additional content, such as one or more advertisements, through some sort of display. In one embodiment, an advertisement is first presented to a user/viewer as an invitation or teaser that attracts the user to the advertisement and encourages the user's engagement. If the user engages in an appropriate way with the invitation, the advertisement might change in some fashion, such as enlarging or taking over the user's display. The invitation advertisement includes one or more engagement properties that encourage the user to engage or interact with the advertisement content. Once the user so engages, an obligation by the advertiser to pay the publisher may be triggered. Payment obligations can vary based on the nature and extent of user engagement, as further described below.

The engagement properties include the user's movement of a cursor over the advertisement content (a "mouse over"), the user's entry of one or more keystrokes from a keyboard, clicking on or otherwise selecting the advertisement content, allowing a countdown or timer to expire as a result of a sustained mouse over the advertisement content, or some other form of user interaction with the advertisement. For example, when using a PDA or phone with a motion sensor or other motion detection capabilities, it might be possible to engage an advertisement by moving the PDA or phone in a particular way to activate the sensor or other capabilities. Similarly, a motion sensor or gesture recognition sensor or device associated with the user's computer could be trained to recognize certain user gestures to indicate engagement, such as a head nod, eye blink, hand motion, etc. Of course, many more methods of engagement or interaction are possible, so the present invention is not limited to just the manners specified herein.

To present these advertisements and their various features to the user, a file (such as an extensible mark-up language (XML) document/file) is served to an advertisement manager in communication with the accessed website/location and some form of content player within the user's computer. The advertisement manager would then take over control of the user's advertisement experience through the utilization of information contained within the XML file. Advertisement servers and/or content delivery networks that store digital advertising content or media assets (including text, images, video, animations, hyperlinks, widgets, dynamic micro-sites, programs, sound, slideshows, etc.) would then serve the content necessary to create the advertisements and their various features, as further described below, in response to the advertisement manager and content player (or other application within the user's computer that is calling for the advertisement).

Figure 2:
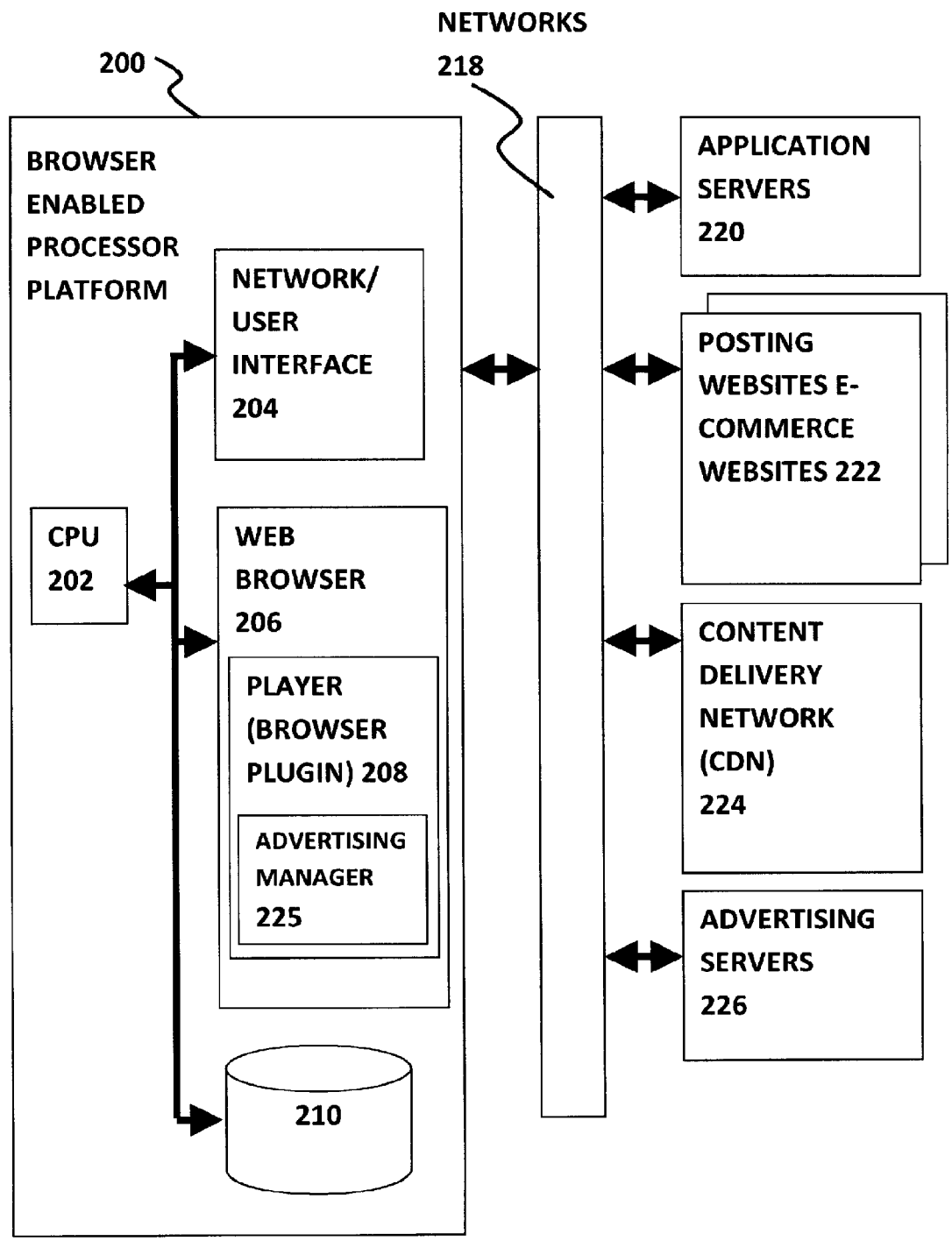
FIG. 2 illustrates a block diagram of a user computer, a network, websites, and other networked components that enable the present invention.

FIG. 2 illustrates a block diagram of a typical user computer, a network, and other networked servers, websites and systems necessary to implement the present invention, according to one embodiment. The browser enabled processor platform (i.e., the user's personal computer or laptop computer) 200 includes central processor unit (CPU) 202, a network/user interface 204, a web browser 206, which includes a player 208 (such as a browser plug-in), and a memory 210. The user of the processor platform 200 may interact with a variety of networks 218, application servers 220, websites 222, a content delivery network (CDN) 224 and advertisement servers 226.

The CPU 202 executes software code for the basic operation of the platform 200. The executable code may include an Operating System, programs, device drivers and other software components. Device drivers may include I/O device drivers and network interface drivers. A device driver may interface to a keypad or to a USB port. A network interface driver may execute protocols for the Internet, or an intranet, Wide Area Network (WAN), Local Area Network (LAN), Personal Area Network (PAN), extranet, or other network.

The memory 210 may contain transactional memory and/or long-term storage memory facilities. The memory 210 may function as file or document storage, program storage, or working memory. A working memory 210 may include, but is not limited to, static random access memory, dynamic random access memory, read-only memory, cache or flash memory. A working memory 210 may, for example, process temporally-based instructions, in part, by temporarily storing code relating to an action of a device and purging that code from the memory in close temporal proximity to the completion of the action. A long-term memory 210 may include, but is not limited to, a hard drive, portable drive, portable disk (e.g., a CD-ROM, DVD, etc.), tape facility, or other storage facility. A hardware memory facility may store a fixed information set (e.g., software code) including, but not limited to, a file, program, application, source code, object code, and the like.

The browser enabled processor platform 200 may also contain hardware for converting analog signals to digital data, or for converting digital signals into analog signals. For example, it may be necessary to convert an analog audio or video source into digital data for storage or playback. As another example, analog signals from a light sensor device could be converted into digital data for the storage of visual information for subsequent storage, playback, or transfer.

The browser enabled processor platform 200 may also include various I/O interfaces, such a hardware network interface, one or more displays, CD/DVDs, storage device, keypads/keyboards, printers, or other standard interfaces. An example of a hardware network interface may be a broadband connection, a dial-up connection, wireless, or other connection. An example of a display may be a monitor, plasma screen, or a liquid crystal display. An example of other standard interfaces may include, but is not limited to, a USB port, parallel port, serial port, microphone, or speaker.

Although the player 208 shown in FIG. 2 is configured as a browser plug-in, it could alternatively be any other form of software component that is adapted to be directly associated with a browser application 206. The player 208 may be a downloadable software component or delivered to the user of the browser enabled processor platform 200 in any number of other ways (e.g., delivered from a CD, DVD, memory stick, portable memory, FTP transfer, etc.). The networks 218 include the Internet and other possible networks, such as Wide Area Networks (WANs), Local Area Networks (LANs), or any other system for enabling two or more devices to exchange information. Further, the networks 218 may include wireless networks.

The player 208 may be a proprietary player or any other player because the advertising capabilities described herein are independent of the player. If the player 208 is a plug-in, it may be a FLASH plug-in player or some similar type of device. Other players are also envisioned and require other plug-in technology (e.g. WINDOWS MEDIA, REAL PLAYER or QUICKTIME players).

In a preferred embodiment, the player 208 is adapted to become directly associated or integrated with the browser application 206. Before playing an advertisement, the user's browser enabled processor platform 200 may be checked to see if it already has the proper player 208 installed and if it does not, the user may be provided with an option to install one, or it may be installed automatically or in some other fashion. The player 208 will be installed in such a way that its functionalities (e.g., opening files from a variety of sources, playing video, music, etc.) are presented to a user through the network/user interface 210, which operates in conjunction with the web browser 206. The player 208 may not be visible to user. This configuration allows a user to interact with websites 222 through the web browser 206 and then interact with any of the player's 208 functionalities through the same user interface. The player 208 may also access the memory 210, such as a hard drive or other storage facility for the storage and retrieval of files.

A user interested in interacting with content presented to the user through a website 222, depending on the particular arrangement between the different systems on the networks, may interact with that content directly on the website 222, or through the content delivery network 224, or on the processor platform 200, if it has been downloaded to the processor platform 200. The content can also be presented to the user by streaming the content from the websites 222, content delivery network 224, or another processor platform (not shown) connected to the networks 218.

Advertising servers 226 are web or other Internet-based applications responsible for choosing an appropriate advertisement to be inserted into a given calling application (as further described below). The advertising servers perform a number of different functions. For example, according to one embodiment, advertising servers 226 provide advertising content to content delivery network 224, so that advertisements may be provided along with other content. Advertising servers 226 may be part of content delivery network 224, or independent servers. The advertising servers also provide XML files to the advertisement manager 225 within the player 208 that controls the display and interaction by the user with the advertising content. According to one embodiment, advertising servers 226 collect advertising content from various advertisers. Advertising servers 226 may also receive information from the advertisement manager or from the content delivery network 224 pertaining to the users who view content through the content delivery network 224.

As noted above, the advertisement manager 225 controls the user's interaction with the advertising content played by the player 208. The advertisement manager 225 also collects and passes on information about the user (such as targeting data) and the user's interaction with advertisements (such as historical data) to the advertising servers 226 and possibly other computers on the networks 218, such as a data warehouse operated by the publisher or advertising company responsible for the advertisements. The user-related information may include the user's Internet Protocol (IP) address, geographic location, nature or theme of the website on which an advertisement is being displayed, the nature of the specific content viewed by the user, the user's web viewing history or patterns, as well as other psychographic data about the user (which may be received from a number of different sources). Information may also be collected about the user's age, location, gender, income, education, ethnicity, product preferences and a variety of other demographic characteristics that are useful in matching an advertisement to a user. Information may also be collected about the user's viewing experience such as the location of player 208, the genre of the content viewed, the type of content viewed (e.g., video, slideshow, widget), and the location of the player 208 within the browser.

Some of this information is collected and analyzed to deliver advertisements to any users, such as targeting data, and some of this information is collected and analyzed to present advertisements to users on future visits that may be more relevant to those users. This information can also be aggregated with similar information about other users and transferred to various advertisers, who will pay for this information. According to one embodiment, the information is passed to the advertising server 226 once a user begins to watch content on a player. If a website has provided the player, it may also provide code that causes the user's information to be passed to the advertising server 226.

Although the advertising server 226 is typically a separate server on the networks 218, it does not have to be a separate piece of hardware and could be combined with other devices, such as the content delivery network 224. If the advertising server function is incorporated into the content delivery network, a user interacting with content on the content delivery network 224 may use his/her own browser enabled processor platform 200 equipped with a network browsing facility, such as the network interface 204 and player 208, to connect to a content file by interacting with a link or other such connection facility associated with a website 222 (or page thereof) as is described in much further detail below.

Figure 3:
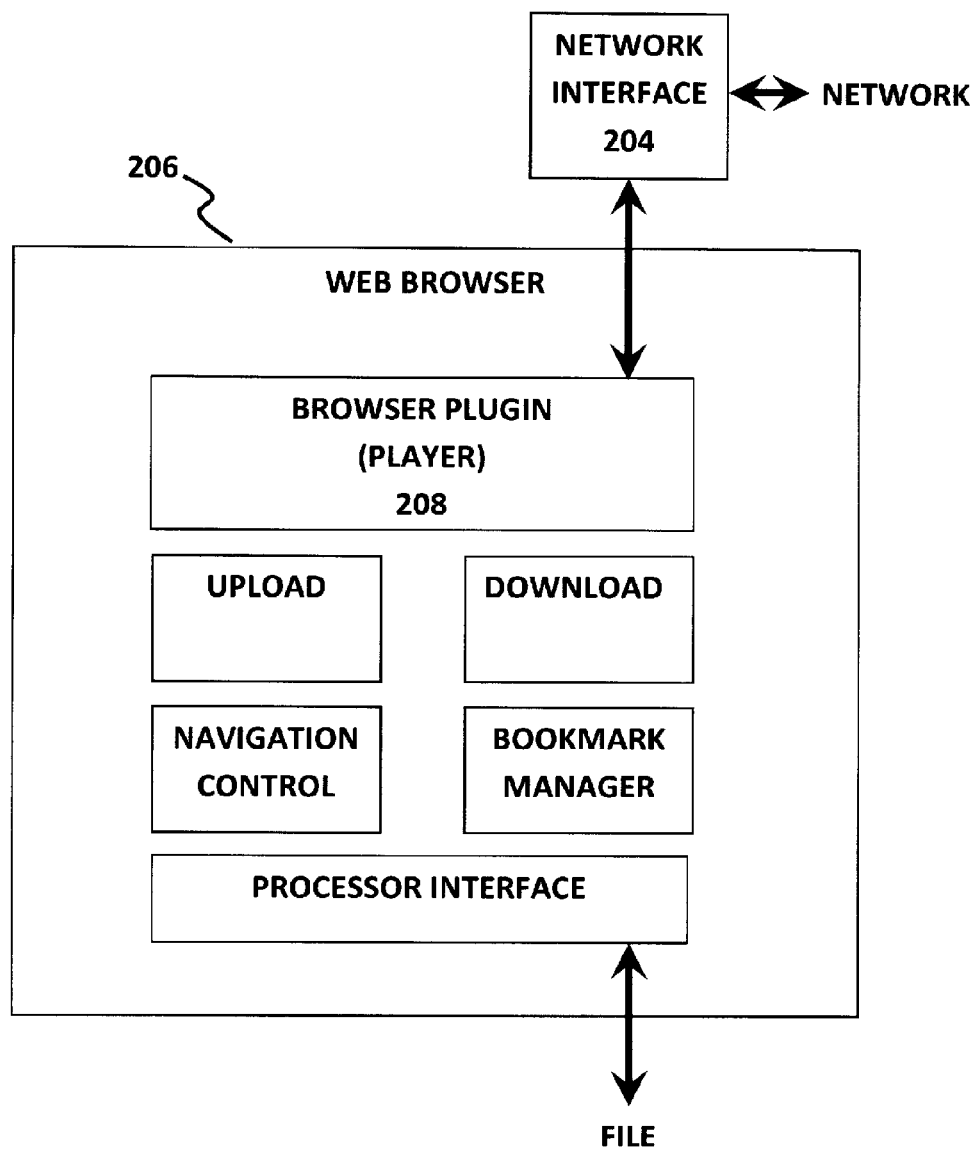
FIG. 3 illustrates a block diagram of an exemplary web browser of the present invention.

FIG. 3 illustrates a block diagram of some of the functional aspects of an exemplary web browser 206, according to one embodiment. The web browser 206 may host the player 208 (e.g., as an integrated browser plug-in) and may provide for the interconnection of the player 208 with external components such as network 218 and file storage within networked storage, such as on the content delivery network 224. The browser 206 may provide upload and download functions through its own processor interface, or through the network interface 204, so as to transfer files to and from other processor platforms, provide user interface network navigation tools, and provide other network user interface tools. The web browser 206 may also provide for a web interface to the user with functions that include navigation control within web pages, bookmark management, favorite page storage and the like.

Figure 4:
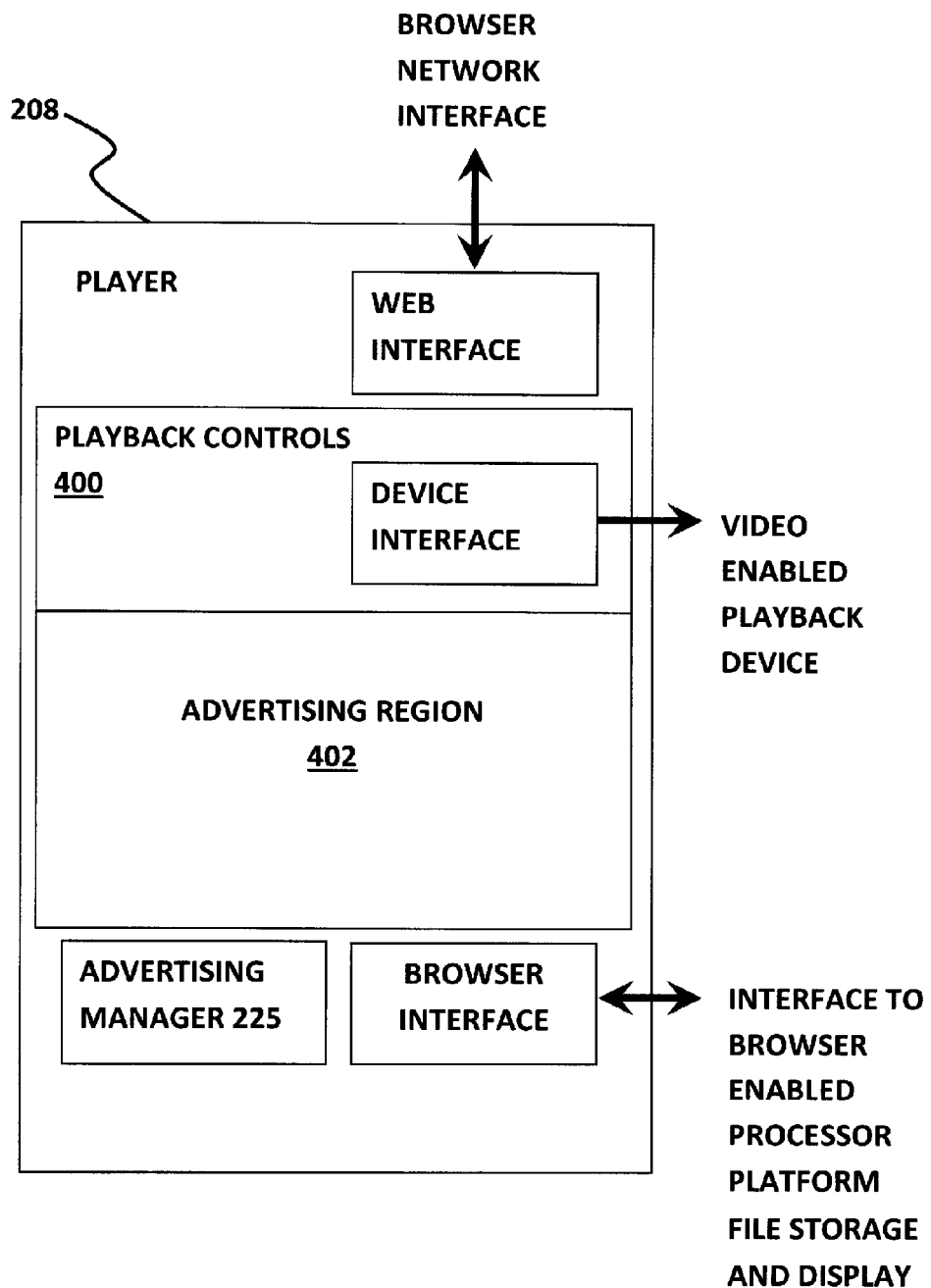
FIG. 4 depicts a block diagram of an exemplary player of the present invention.

FIG. 4 depicts a block diagram of an exemplary player, such as player 208, according to one embodiment. The player 208 displays content selected by the viewer or made available to the user through a website. The player 208 also provides a user interface that allows the downloading, copying, viewing and interaction of content files previously stored on the content delivery network 224 or elsewhere, such as the advertising servers 226. The downloading of or other interaction with content files, as described herein, is enabled through the player's web interface to the browser network interface. The video viewing or navigation interface of the player 208 may be a FLASH-based, or other some other type of browser-based, player adapted to deliver content as a part of a website. The player 208 may also be a FLASH-based navigation interface which allows users to select content to view. Content files may also be stored in the browser enabled processor platform 200 through the player's browser interface. To the degree that video content is involved, playback controls 400 can provide typical VCR/DVR-type controls, such as play, stop, pause, rewind, fast forward, copy, paste, cut, save, and other such control features.

A client may embed the player 208 directly into any type of interactive electronic document using Hyper-Text Markup Language (HTML). When the player 208 requests content from the content delivery network 224, or the advertising servers 226, that content is then be made available to the player 208 for display and interaction. The application servers 220 monitor traffic to and from the content delivery network 224, take action when necessary, such as to delete content, and generate reporting data for advertisers.

The browser 206 may be a software application for navigating one or more networks 218, such as the Internet, intranet, extranet, a private network, and or content in file systems. The browser 206 also enables a user to display and interact with text, images, videos, audio and other content accessible through the networks 218. Such content may contain hyperlinks to navigate to other web pages at the same or different websites 222. Web browser 206 may allow a user to navigate and access information provided on many web pages at many websites 222 by traversing these links. Web browser 206 may also provide other features such as storing the address for a favorite website utilizing the browser's Bookmark Manager. Examples of bookmarked websites 222 may be hyperlinks to other personal sites, e-commerce sites, government sites, or educational sites. Another feature of web browser 206 may be caching, where recently visited websites 222 are transferred through the processor interface and stored in processor memory to decrease retrieval time for subsequent calls for the website 222. Examples of web browser 206 include the MICROSOFT INTERNET EXPLORER, MOZILLA FIREFOX, OPERA and APPLE SAFARI browsers. Although browser 206 may typically be used to access the World Wide Web, it may also be used to access information provided by web servers in private networks or content in file systems.

Web browser 206 may communicate with web servers through the network interface primarily using Hyper-Text Transfer Protocol (HTTP) to fetch web pages. HTTP may allow a web browser 206 to upload information across the network interface to web servers as well as download web pages from them. Web pages are located by means of a Uniform Resource Locator (URL), which may be treated as an address, beginning with http: for HTTP access. Many browsers 206 may support a variety of other URL types and their corresponding protocols. Examples of other URL types may be ftp: for File Transfer Protocol (FTP), rtsp: for Real-Time Streaming Protocol (RTSP), and https: for HTTPS (an SSL encrypted version of HTTP). The file format for a web page may be HTML. Browser 206 may also support formats in addition to HTML. Examples of other support formats may be JPEG, PNG and GIF image formats, and can be extended to support more through the use of browser plug-ins. An example of a browser plug-in may be MACROMEDIA'S FLASH or APPLE'S QUICKTIME applications. The combination of HTTP and URL protocol specification may allow web pages to have embedded images, animations, video, sound, and streaming media into the webpage, or make them accessible through the web page.

The player 208 also includes an advertising region 402 that may or may not contain an advertisement. For example, the advertisement manager 225 may cause an image of a cola bottle to be displayed within a display window corresponding to a website 222. The cola bottle could be limited to being displayed within the advertising region 402, but need not be so constrained. The cola bottle could come out of the advertising message, such as an invitation or teaser advertisement, and move around the screen in some fashion, or when the website was first displayed, the cola bottle could be made to travel around different parts of the window or the display area of the user's computer, with the intent of capturing the user's attention and drawing them to interact with advertising messages within the advertising region 402 or elsewhere. These advertising messages may be self-activating or trigged by a user's interaction with some form of an interaction prompt within a window or the advertising region 402.

Accordingly to one embodiment, the invitation or teaser advertisement could be associated with a single advertiser or multiple advertisers. For example, the invitation could represent an advertisement for a single good or service from a single advertiser, or multiple goods or services from that advertiser. Likewise, multiple different advertisers could be represented by a single invitation space. Each good or service could be presented in a different way. For example, a rectangular-shaped invitation space could be broken up into four quadrants, with a different good or service presented in each quadrant of the space. Alternatively, the different advertisements could operate like a slide show, with one advertisement being shown in the invitation space for a number of seconds before being replaced by another advertisement.

This might make it possible for a publisher to fully exploit an advertising opportunity in a new way. For example, if a user within a particular demographic, such as 18-34 year old males, was not interested in the one good or service presented in an invitation with a single advertisement, the opportunity to engage that user could be lost. However, if the same user were presented with a number of different advertisements at the same time or in sequence, the user might be interested in one of the advertised goods/services and choose to engage with that advertisement. Once the user has engaged with that advertisement, if the user has a good experience, the user might be inclined to engage with some of the other advertisements provided in the same invitation.

Figure 5:
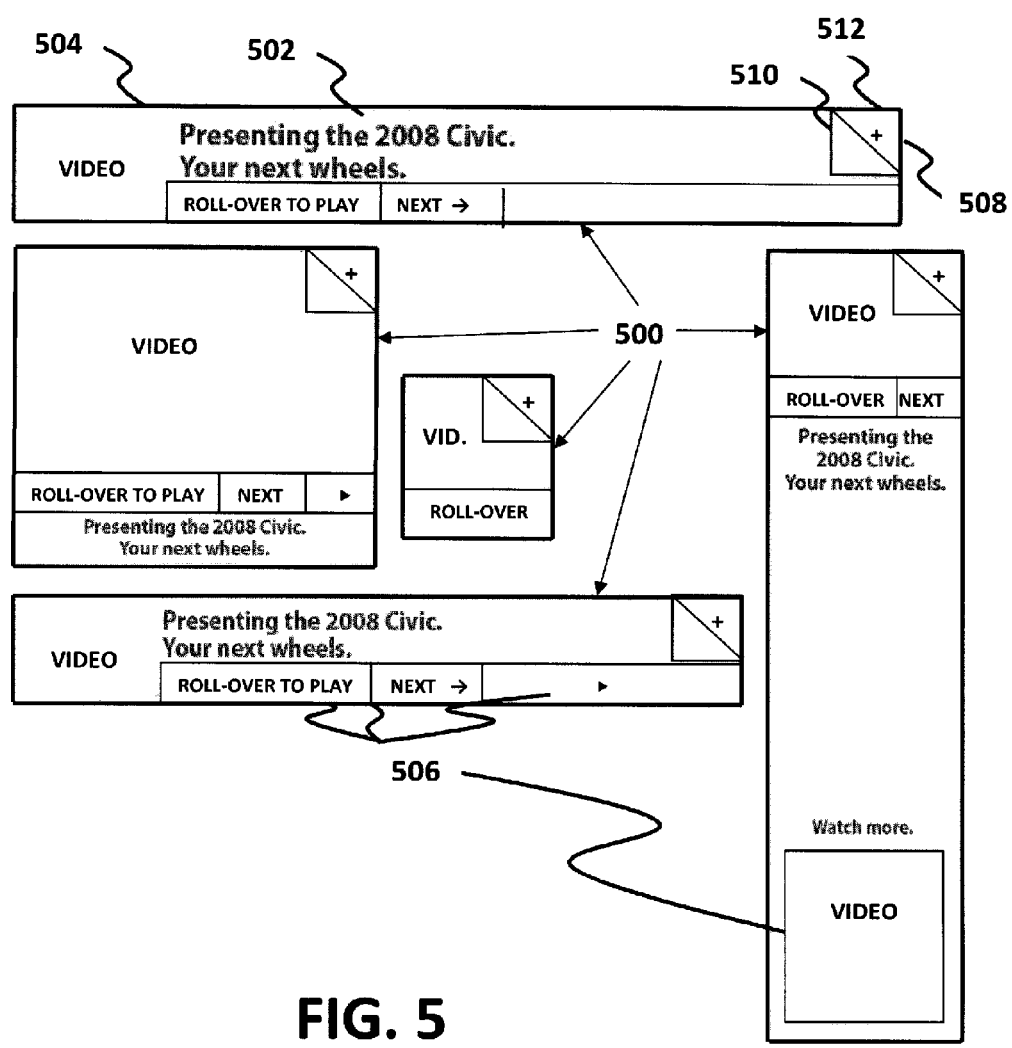
FIG. 5 illustrates a number of dynamically sized advertisement units, each including an engagement property and other features of the present invention.

According to one embodiment, upon the user's interaction with the interaction prompt, a further advertising message is presented. For example, if the cola bottle was the interaction prompt, once the user clicked on the cola bottle, the invitation or teaser advertisement would transform into a full advertisement associated with the cola, either within the advertising region, or within all or some other part of the window. Once the user has experienced the full advertisement, the user would be able to close the full advertisement, as illustrated in FIG. 5 below, and return to the website or page or other area from which they started. When they do return to this area, the invitation they first viewed could be changed to represent some other advertised good or service, rather than continue to advertise the good/service with which they have already engaged.

As noted above, the cola bottle is just one example of an interaction prompt and the invention herein is hardly limited to just that example. Further interaction prompts include text (i.e., "Click Here to See Ad"), some other graphic element (aside from the bottle), a playback control 400, a keyboard prompt, voice activation, etc. The types of interaction can vary greatly and could be different for different users depending on their psychographic data, demographic characteristics, or other factors, such as prior interactions with interaction prompts (i.e., if the user has only interacted with a particular type of interaction prompt in the past, the same type of interaction prompt may continue to be used for that user, versus switching to a different type).

Upon the user's engagement with the interaction prompt, a number of other different actions could occur in addition to presenting the user with a full advertisement. If the user was watching a video or some other form of content within the window at the time of the interaction, the viewing or navigation interface could be placed in a suspended state (i.e., paused). In one embodiment, such pause may be for the duration of the advertising message, until a user action occurs, or for some other duration. Of course, not all users will necessarily appreciate having the content they are viewing disrupted by an advertisement that they may have inadvertently engaged with by doing something as innocuous as moving their mouse. In one embodiment, the interaction prompt provides the user with a warning or counter to let the user know that what they are doing within the window is causing an advertisement to engage and that something will happen shortly if they do not do something to change the situation.

For example, as illustrated in FIG. 5, which shows a number of differently sized advertisement units (invitations or teasers) 500 comprised of text 502, images 504 and elements 506, an interaction prompt 508 (one of a possible plurality of engagement properties) is located at the top right corner of each advertisement unit. The interaction prompt is comprised of a graphic element 510, comprised of a turned corner, and an engagement warning or indicator 512, comprised of a change symbol as the warning device. The turned corner of the graphic element 510 makes the advertisement look as though it is made of paper and that the upper right hand corner has been bent forward as if to turn the page. The turned corner gives the user the visual image that there is something else behind the advertisement that could be reached by interacting with the upper right hand corner.

The engagement warning and/or change symbol 512 functions to indicate to a user that has with the graphic element that continued engagement will cause an action by the advertisement to occur. As illustrated in FIG. 5, the engagement warning 512 is a "plus" sign that warns or indicates to the user that there is something more associated with the advertisement. For example, the plus sign can warn the user that engaging with the advertisement unit 500 could cause the action to occur, such as advertisement changing in some way, i.e., expanding, increasing or growing. Other stylized symbols could be used in place of a standard plus sign to indicate expansion, such as two intersecting curves that appear to form a plus sign, or many other variations that indicate expansion, growth or that something more might occur if the user interacts with the symbol. An expansion is just one action that can occur that the engagement warning or change symbol can indicate to a user. For example, as further discussed below, the change symbol 512 might be a minus sign to warn the user of a contraction if the symbol was engaged, or a counter to warn the user of the passage of time. Many other possible ways to warn the user of actions are possible.

Thus, the user is presented with a number of visual clues that engagement with the interaction prompt 508 or the advertisement unit 500 might cause something to happen. As noted above, rather than simply having the advertisement units become active (i.e., change, start to play video or music, take over the window in which they are displayed, expand in size in some way, etc.) when the user moves the mouse over the interaction prompt 508 or over the advertisement unit 500, the interaction prompt could be used to provide the user with a warning or notice of engagement. For example, the change symbol 512 could change from a "plus" sign to a number, such as the number "3", when either the engagement prompt 508 or the advertisement unit 500 was moused over by the user. If the user continued to hold the cursor over the prompt 508 or unit 500 for more than a predetermined period of time, such as one second, the number "3" might change to the number "2". If the user continued to hold the mouse over the prompt 508 or unit 500 as the countdown continued, the advertisement would become fully active, such as by pausing the other content being viewed and expanding to take over more visual space on the user's computer display.

While the counter method described above is particularly intuitive, the systems and methods of the present invention are not limited to just a counter technique. Many other forms of user engagement warning or notices could be utilized. One significant value of the engagement warning is that it gives users an opportunity (a period of time) to decide whether they want to engage with the advertisement without any significant change occurring in the meantime. Many prior art techniques cause an immediate change, such as expanding the advertisement, stopping a video from playing, redirecting the user to a different website. Many users find such techniques to be bothersome and annoying. The engagement warning of the present invention avoids this problem.

Figure 6:
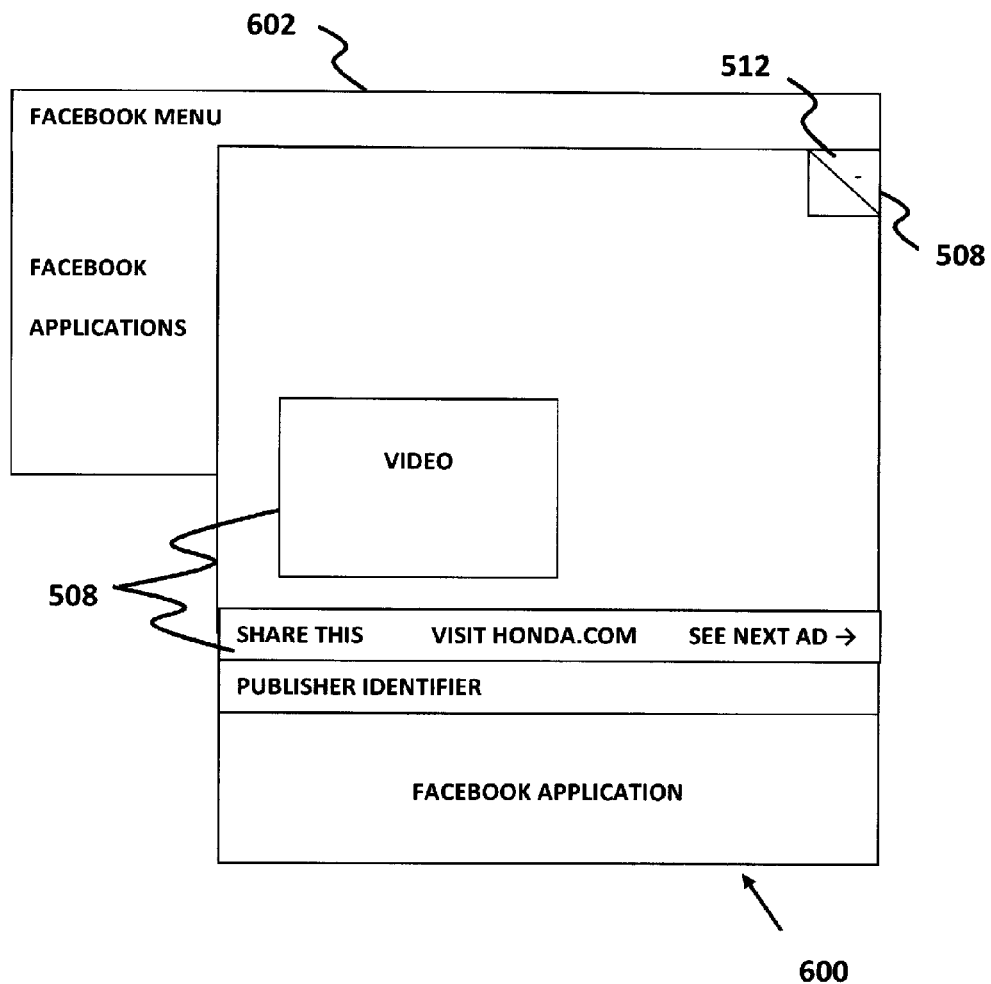
FIG. 6 illustrates an expanded advertisement from FIG. 5 within a website application.

FIG. 6 illustrates an expanded advertisement 600 within a website application 602, according to one embodiment. FIG. 5 provides an advertisement 300 for a HONDA CIVIC automobile. If the user engages with one of the advertisement units 300, the advertisement 300 might expand into the advertisement 600, as illustrated in FIG. 6. In FIG. 6, the advertisement 600 for the automobile has expanded to cover most of the content otherwise normally available on the user's website application 602, in this case a webpage within FACEBOOK. The change symbol 512 in FIG. 6 has changed to a "minus" sign to indicate that the advertisement is fully expanded and that the advertisement can be reduced to its original size by interacting with the change symbol 512 (i.e., clicking on the "minus" sign).

The expanded advertisement shares other features, in addition to the interaction prompt 508, such as elements 506. As an aside, although not shown in the figures, the visual transition that occurs between an advertisement unit and an expanded, active or full advertisement gives the developer of the advertisement an opportunity to identify itself. After a countdown passes or some other action has occurred that causes an advertisement to transition, the advertisement developer could briefly display its logo, name or some other identifier so that a user would be able to identify the entity that created the advertisement.

Returning to FIGS. 5 and 6, elements 506 enable the advertisement units 500 or expanded advertisements 600 to have a number of additional functions and to extend or otherwise expand the user's experience. As illustrated in FIG. 5, one element 506 instructs the user to "Roll-over" or "Roll-over to play" (some units 500 and advertisements 600 also include the universal "play" button to illustrate this feature to English and non-English readers). If a user rolled-over this element 506, then the image 504 could be transformed from just an image into video, or the unit 500 could be expanded to a larger advertisement 600. Another element 506 instructs the user "Next" and includes an "arrow" button to further illustrate this feature. Selecting the Next element would cause the advertisement 500 to be replaced by an entirely new (the "next") advertisement that had already been cued up and was ready to play in the event the next element was selected. Thus, if a user liked one advertisement, the user might be interested in engaging with additional advertisements from either the same advertiser, or related to the same product, or from the same publisher, etc. As previously mentioned, the next advertisement could also be for a completely different advertiser. After the "next" advertisement, there could be more next advertisements cued up and ready to become active, and on and on until all of the advertisements that could be shown were shown to that user.

Another element 506 might allow a user to watch a different video associated with the unit 500, or do other things, such as turn sound on or off, bookmark or save the advertisement, provide feedback, or control other aspects of the user's experience. For example, in FIG. 6, elements 506 operate as a share tool that enables the user to share the advertisement with a friend by opening an email application that can be used to email the advertisement to anyone. The share tool or elements 506 could also be used to enable the user to visit the advertiser's website (i.e., HONDA.COM). The number of functions that could be developed by the share tool of elements 506 to expand or extend the user's experience is limitless, but a few related or additional examples are provided below with respect to FIGS. 7 to 12.

Figure 7:
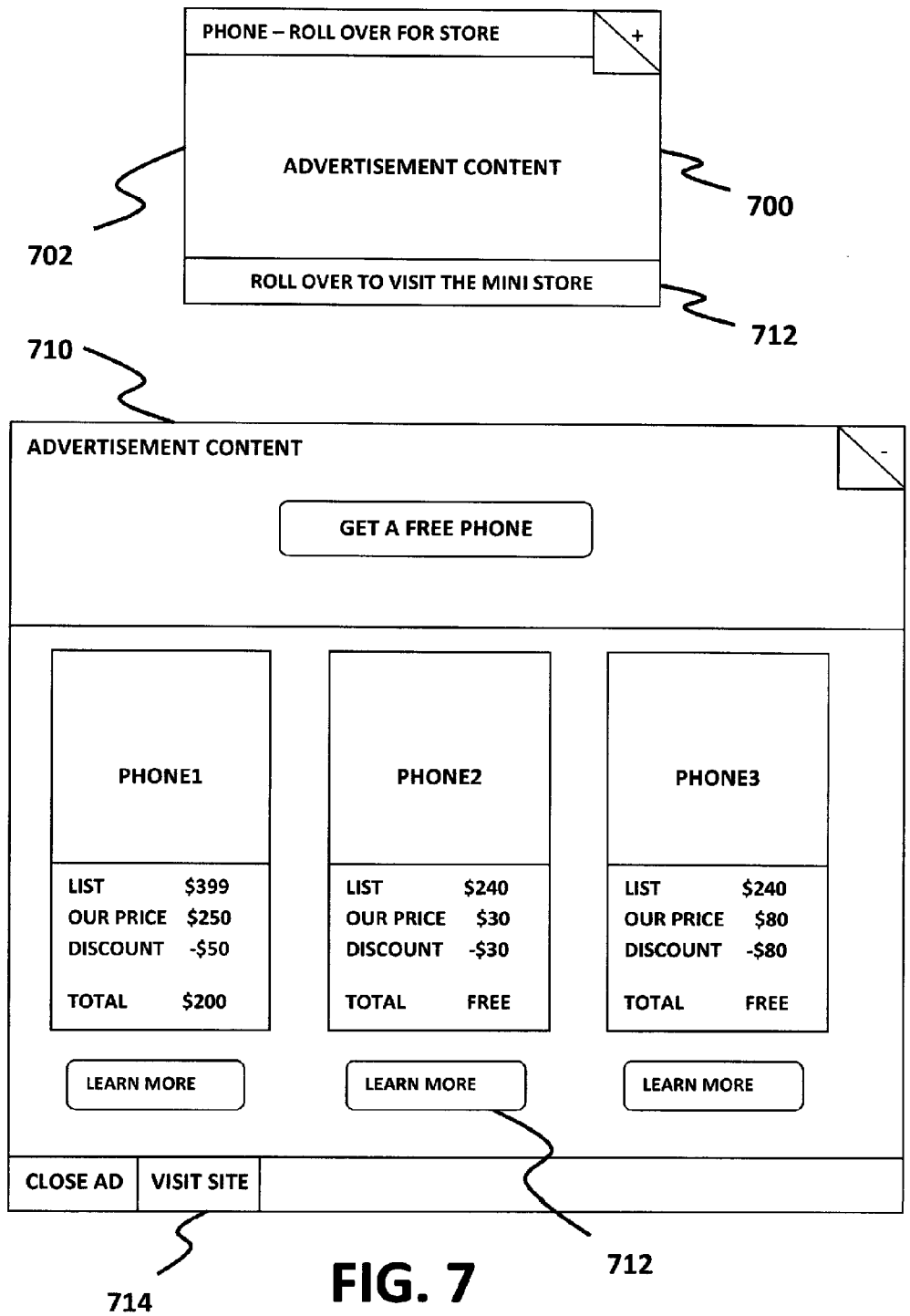
FIG. 7 illustrates a mini store invitation and expanded mini store advertisement in accordance with the present invention.

FIG. 7 illustrates an invitation advertisement 700 for a phone company mini store that includes some kind of advertisement content 702, a title 704 with instructions on how to interact with the advertisement 700, and other engagement devices 706. When a user engages with the advertisement 700, it expands into advertisement 710 that provides a mini store where users can browse through numerous different products, in this case a number of phones, see the pricing for the offered products, and purchase or learn more about the products. For example, selecting the "Learn More" button 712 under Phone 2 might take a user to another website with more information about Phone 2, such as its features, or might take the user to an on-line purchasing page where Phone 2 can be purchased. Alternatively, if a user was interested in the advertiser (the phone company), but hesitant to buy from the advertisement, the user could select the "Visit site" button 714 and go directly to the phone company's website.

Figure 8:
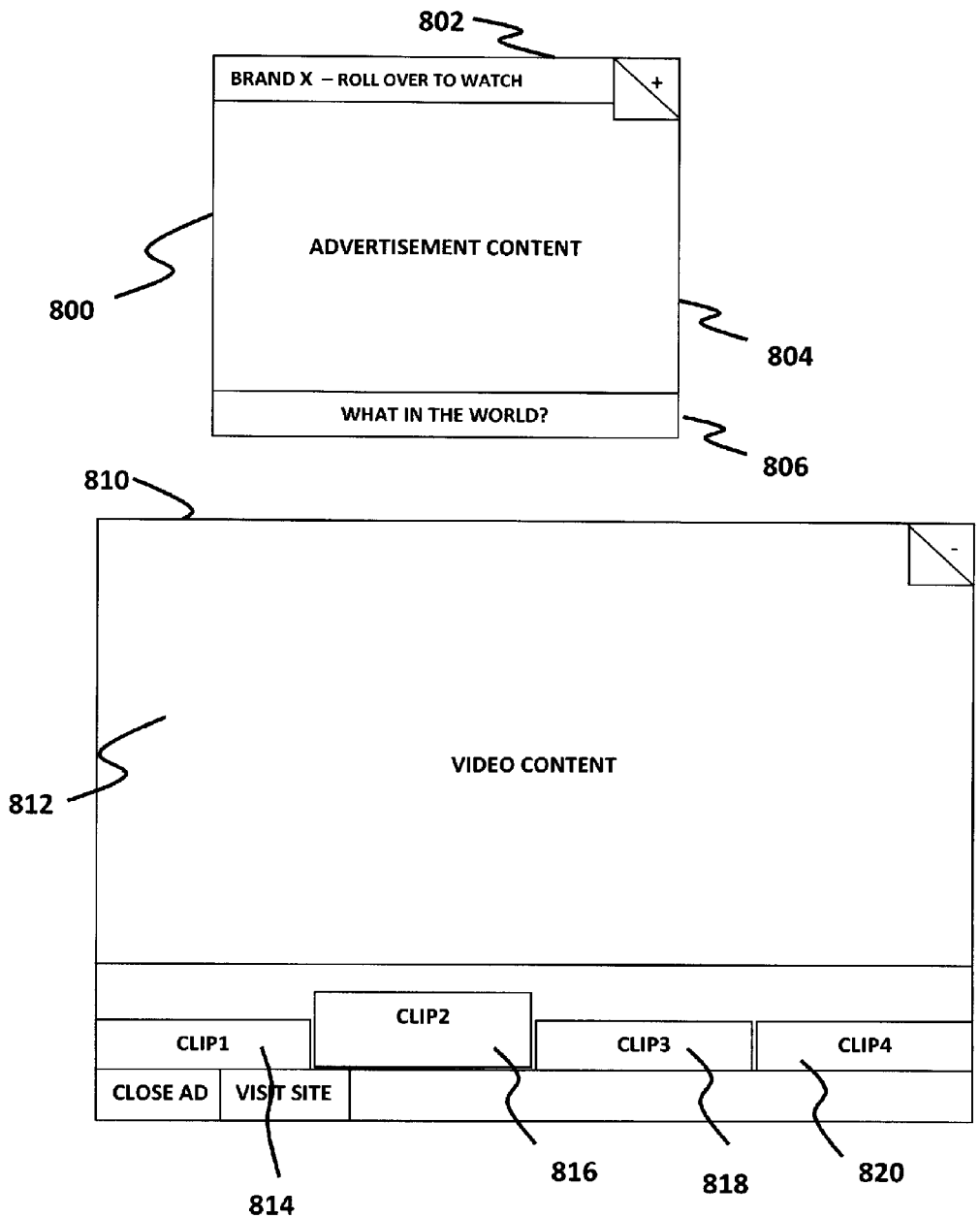
FIG. 8 illustrates a teaser advertisement and an expanded advertisement that uses readily navigatable widgets to deliver additional content in accordance with the present invention.

FIG. 8 illustrates an invitation advertisement 800 for Brand X, which includes a title 802, some form of teaser content 804 to interest the user, and other engagement content 806, in this case the provocative phrase "What in the world?" When the user engages with the advertisement 800, it expands into advertisement 810 that includes a video advertisement 812 and a number of easily navigated widget-based tabs 814 to 820. Advertisement 800 is meant to provide the user with the ability to view multiple different pieces of content while within a single advertisement 810. While one video or other form of advertisement content was being displayed, in this case Clip 2 of widget tab 816, the corresponding tab is raised above the other tabs so the user knows which one is playing. To select different content, the user would mouse over either widget tabs 814 818 or 820 and select one of those tabs, or interact with them in some other appropriate manner. This advertisement formats allows the advertiser to present significantly more content to a user, without requiring the user to exit the webpage or website they were at when they engaged the invitation advertisement.

Figure 9:
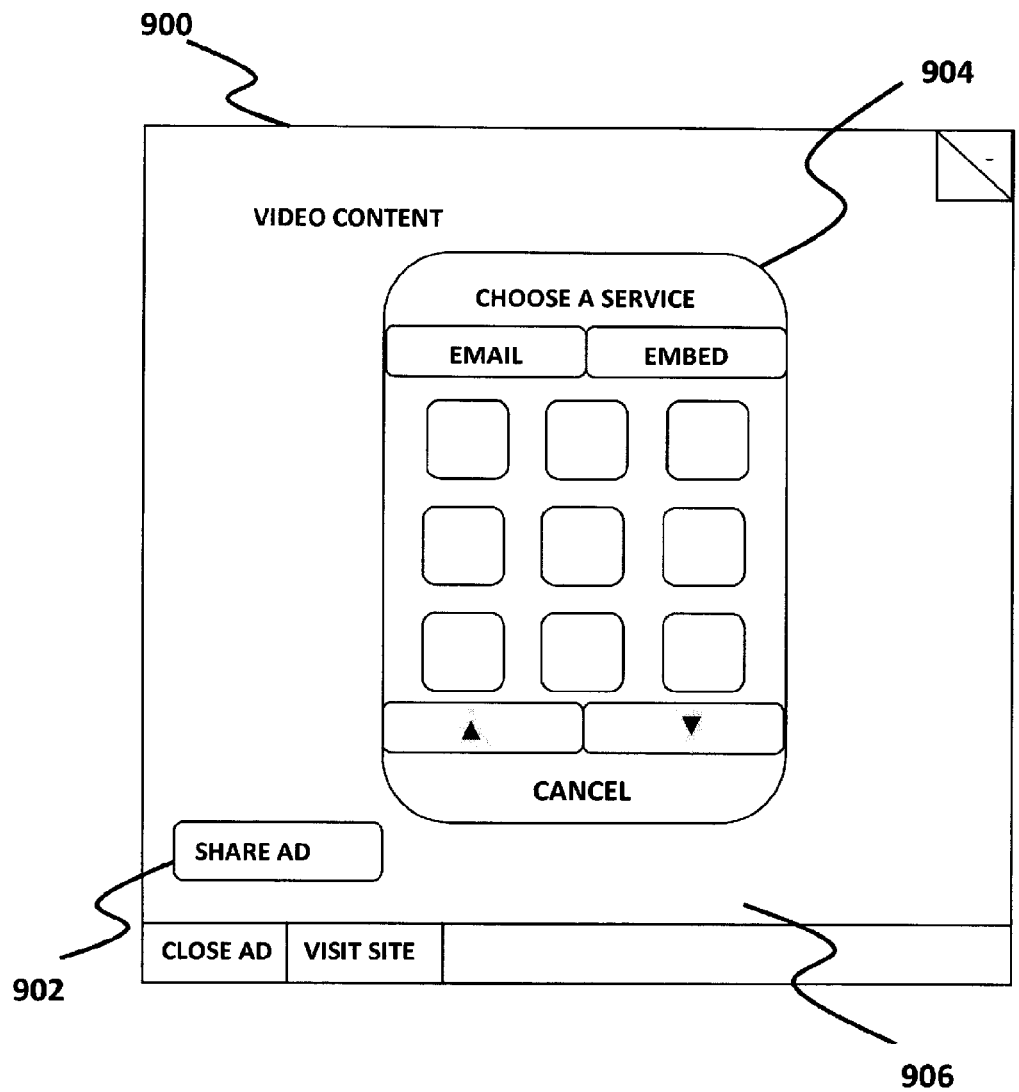
FIG. 9 illustrates an expanded advertisement that enables sharing or saving of some component of the advertisement or the entire advertisement through operation of a widget in accordance with the present invention.

FIG. 9 illustrates an advertisement 900 that enables the user to share with, or push the advertisement 900 to other people. When the user selects the "Share ad" button 902, at any time, a widget 904 will appear in front of the advertisement content 906 (which may be paused or suspended as a result). The widget 904 allows the user to email the advertisement 900 (including any video, widgets, engagement features and other content) to another person (through the user's default email application) or embed the advertisement 900 in a blog, social networking website or other host environment, such as the MYSPACE website, FACEBOOK website, etc. To simply the process of emailing the advertisement 900, the widget 904 will prepare the advertisement 900 as an attachment to an email, embed it within the body of an email message, or provide a link to the advertisement that can be inserted into an email message. To simplify the process of embedding the advertisement 900 in any of a large number of other environments, the widget 904 will prepare the advertisement 900 based on the host environment selected by the user from a scrollable list. When a host environment is selected, the user will either be presented with the code or other tools needed to insert the advertisement 900 into the desired host environment.

Figure 10:
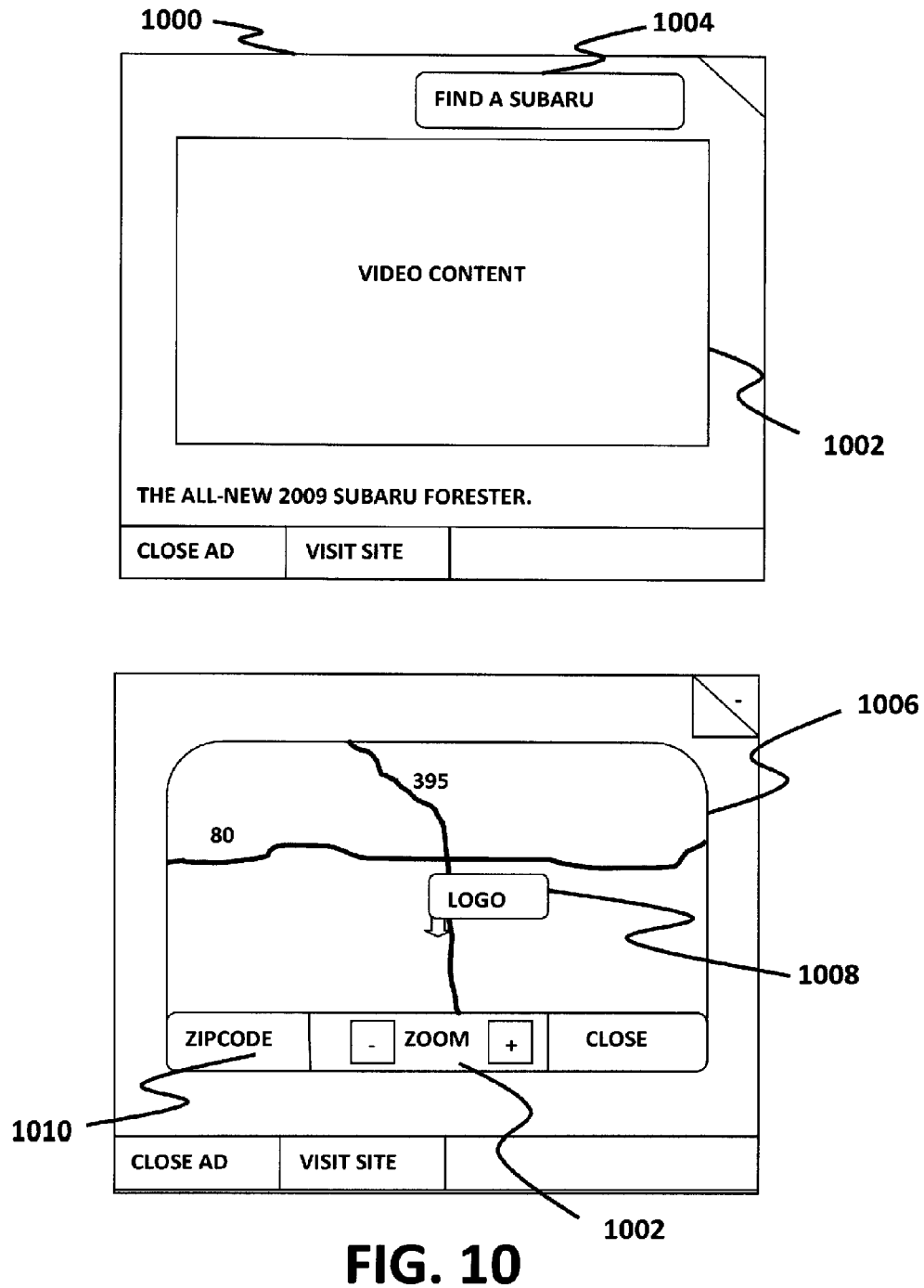
FIG. 10 illustrates an invitation and an expanded advertisement with a localization feature and a map widget in accordance with the present invention.

FIG. 10 illustrates an advertisement 1000 that includes a localization tool that enables the publisher to push local experiences into the advertisement. The localization tool utilizes a service that captures the Internet Protocol (IP) address for the user and traces that to a zip code that corresponds to the user's physical location. The user can then be presented with information relevant to the advertisement that has a local connection to the user. For example, advertisement 1000 plays a video 1002 for the 2009 SUBARU FORESTER automobile and invites users to find their local dealer by selecting the "FIND A SUBARU" button 1004. When the user selects button 1004, a map widget 1006 opens that shows the user where the nearest dealer is to the user based on the zip code traced by the localization service. As illustrated in FIG. 10, the user is physically located in the Reno/Sparks area of Nevada, and a dealer, as indicated by the icon 1008, is located near highway 395 just south of the highway 395/highway 80 interchange. Since IP addresses do not always trace to the exact location of the user, the map widget 1006 includes a zip code entry section 1010 so the user can manually enter a zip code and a zoom feature 1012, so the exact location of the dealership can be located.

Figure 11:
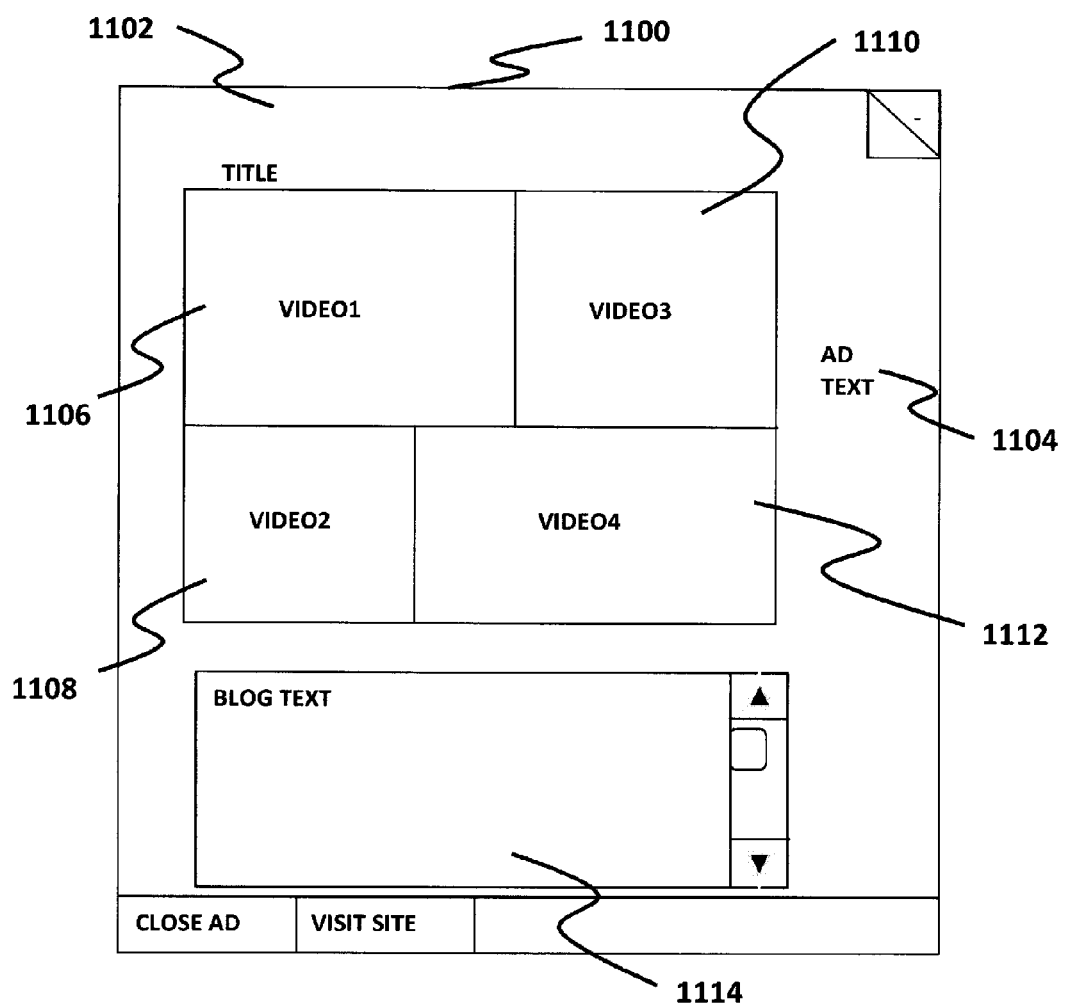
FIG. 11 illustrates an expanded advertisement with dynamic components in accordance with the present invention.

FIG. 11 illustrates one example of a dynamic content advertisement 1100. The expanded advertisement 1100 includes a title section 1102, some advertising text 1104, four video areas (video1 1106, video2 1108, video3 1110 and video4 1112), and a blog text section 1114. The video areas depict four different video scenes, each of which might be driven from a live video feed, such as streaming video. The blog section 1114 includes text that is being fed into the advertisement 1100 through an RSS feed. Any other frequently updated content could also be fed into the section 1114, such as pod casts, news headline, stock quotes, etc. In FIG. 11, a series of blog entries are listed in section 1114. Although one is shown, a user could access the other blog entries by moving arrow keys on their keyboard, clicking a selection button while they are moving the mouse over the section 1114, etc.

Figure 12:
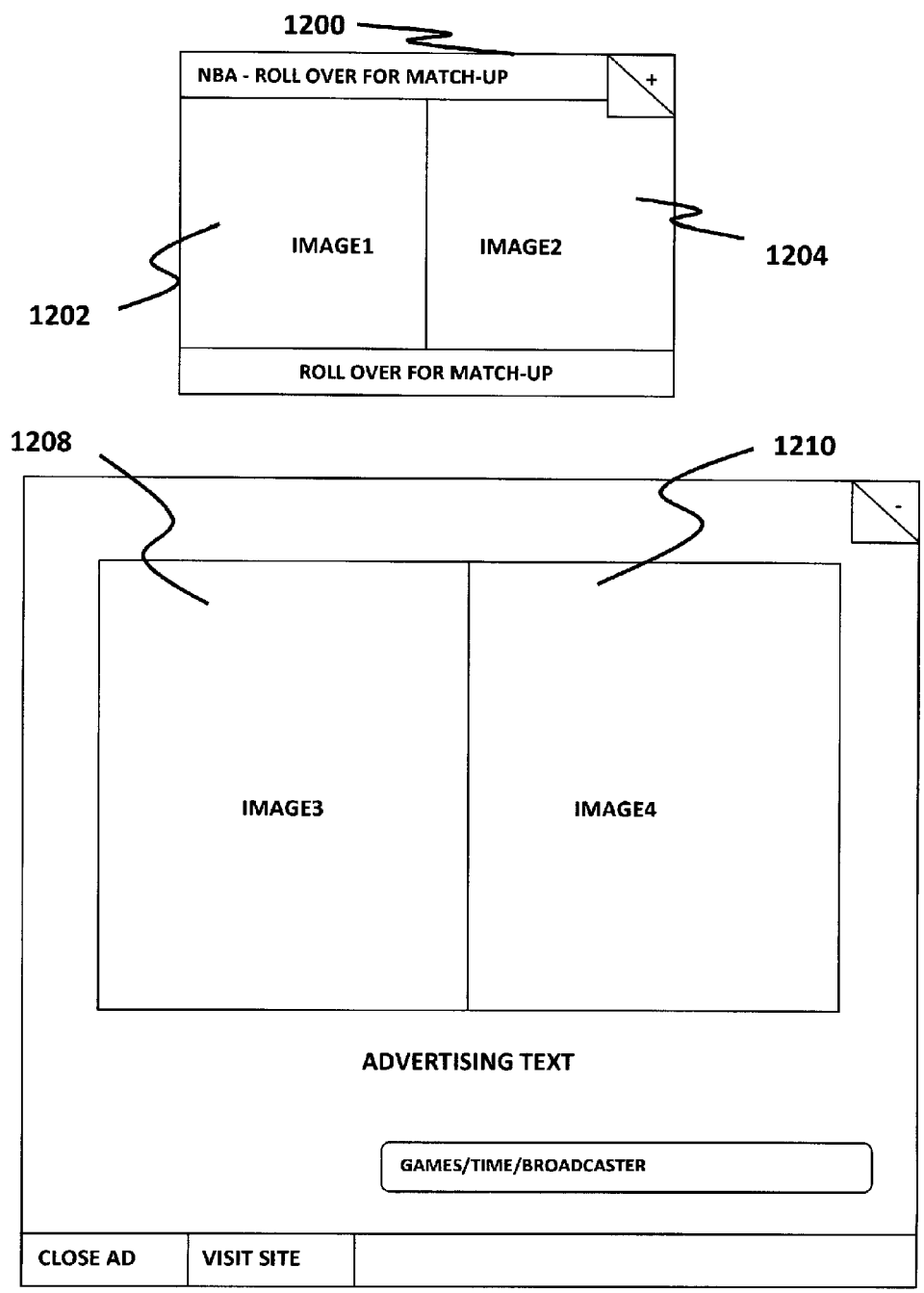
FIG. 12 illustrates an invitation and an expanded advertisement with dynamic components and localization features in accordance with the present invention.

FIG. 12 illustrates another example of a dynamic content advertisement. In FIG. 12, invitation advertisement 1300 is an advertisement for the National Basketball Association (NBA) finals. It illustrates two images: image1 1202 includes a picture of one basketball player (or a logo or similar representation) from one team; and image2 1204 includes the picture of a different player, logo, representation, etc. from a different team. Illustrating the images of different basketball players from different teams is meant to express the competition between the opposing teams. If the user engages with the invitation 1200, the full advertisement 1206 opens and displays additional content, which might include the images (1208 and 1210) of more players, video footage of the teams playing, etc., and includes the names of the teams that will be playing, what time they will play, and what broadcaster is carrying the game. Combining this RSS feed data with a localization tool or service would enable the playing time to be adjusted for the user's actual time zone. Additional dynamic data, such as other games being played, etc. could also be displayed, such as in area.

In addition to the dynamic advertising elements discussed above, many other dynamic elements could be utilized in an advertisement, such as a widget, a real-time or downloadable application, a dynamic micro-site (i.e., a mini-site or weblet that is comprised of a web page or cluster of pages), a slide show, etc. The content illustrated also need not be static, whether in the original or expanded form. Hence, the images or text or other elements within an advertisement unit could be changed on some periodic basis, such as after a period of time, after the user's cursor has spend so much time over the element in question, after the user has engaged with the advertisement in some other way, or in many other ways, as further noted below. Further, as noted with respect to the share feature of FIG. 9, the advertisements or the elements of the advertisement can be capable of independence from the website 222 or other environment in which they first displayed. For example, if the advertisement was created as a stand-alone application or as a micro-site, versus being delivered by the browser, it could be removed (i.e., downloaded) from the website on which it appears and used on its own in many other environments, e.g., dragged and dropped onto a desktop or other storage area, emailed or shared with others, embedded in other electronic documents, etc.

As noted above, some or all of the components of the advertisement, versus the advertisement as a whole, could also have independence. For example, a user may be able to grab a component of the advertisement, such as a widget, an application, a slide show, etc., and drop it onto their desktop or some other location, or otherwise downloaded in some form. Preferably, the component would include some indicator of the advertiser or the good/service being advertised. A video, an animation, music, etc., that could be removed from the advertisement and used in other ways could significantly enhance the value of the advertisement to the advertiser. Once removed from the advertisement, the component could express additional independence and could be re-sizeable and changeable in other ways.

Having described some of the various types of advertisements that could be generated, the components and content of such advertisements, and some of their many features, it is now necessary to describe the manner in which advertisements are generated, such as in the context of the architecture illustrated in FIG. 2. To generate an advertisement in a webpage or flash player, for example, a request must be made for the advertisement to be inserted in the webpage or player, such as player 208. The application making the request or call is referred to herein as the calling application. The calling application could come in many different forms: (1) a standard website or web application that is based on HTML, JAVASCRIPT or CSS code; (2) a rich-media application delivered via a web-based plug-in, such as a ADOBE FLASH plug-in; (3) a rich-media component of a web application, such as a FLASH or QUICKTIME-based video player, embedded game or widget; (4) a mobile application, such as an IPHONE or mobile JAVA application; or (5) any other Internet connected application.

In one embodiment, the calling application makes a request or call to the advertisement manager 225 to embed an advertisement in the webpage or player via an application programming interface (API) provided by the advertisement manager 225. The advertisement manager 225 is a collection of code that manages the user's advertising experience, including loading the XML file, referred to above, from the advertising servers 226, and rendering the advertisement as part of the calling application (in this case player 208). Although the advertisement manager 225 is shown in FIG. 2 as part of the player 208, the advertisement manager 225 is a code library that could reside in any of a number of places within the user's computer 200 or elsewhere that is accessible to the user's computer 200. For example, the advertisement manager 225 could be a FLASH file loaded into the player 208 that is application specific (e.g., .swf).

The API of the advertisement manager 225 allows the calling application to pass on targeting data, such as the user's age and gender, and specifics on what kind of advertisement it wants, such as the available size or particular advertisement types. The code and structure of the API varies depending on the type of calling application. For example, the API for a video player may be totally different than the API for a web application, which may be totally different than the API for an IPHONE application. The API can also provide extra functionality, such as instructions regarding how an advertisement should be shown, instructions for hiding an advertisement, or a callback for informing the calling application that an advertisement has been shown or is being shown.

Once a request for an advertisement has been made to the advertisement manager 225 from the calling application, the advertisement manager 225 then operates as an advertisement requester and in turn makes a request to the Advertising Server(s) 226 to get a particular advertisement based on the application request and the targeting data and, in the process, pass along any data about the user, the kinds of advertisements that are allowed, the available size and other data. The advertising server 226 then picks an advertisement from a set of available advertisements based on the incoming data and other internal data, such as which advertisements perform best, which advertisements make the most money, how many of each advertisement it is supposed to deliver, etc. Once the advertising server 226 has selected an advertisement to send to the calling application, the advertising server 226 will return a file to the advertisement manager 225 to the calling application. This file includes advertising metadata corresponding to the selected advertisement and allows the advertisement manager 225 to become an advertisement configuror as further described below. The form of the file varies depending on the type of calling application or the type of the advertisement, but is most often an XML file and is referred to herein accordingly.

The advertising metadata defines the various elements (including text, image, video or other rich-media elements) to be used in a particular advertisement. The advertising metadata also describes to the advertisement configuror of the advertisement manager 225 how those elements should be displayed, what engagement data for that advertisement should be collected and where it should be sent, and other data necessary to render and track the advertisement. Although the advertising metadata describes how elements should be displayed, it does not control how the elements will actually be displayed on the user's computer 200, which is managed by the advertisement manager 225. For example, to display an advertisement on a user's computer 200 comprised of a video and a headline of text, the advertisement manager (typically JavaScript and/or ActionScript) running on the user's computer ("client-side code"), would read the XML file (including the advertising metadata) to determine what content to use (i.e., the video and headline), download that content from the advertisement servers or the content delivery network, and determine where to put the video and the headline (and how big to make them) based on the space (i.e., size and shape) available for the advertisement.

Upon receipt of the XML file, the advertisement manager 225 parses the advertising metadata and loads any advertising media assets referenced in the advertising metadata from an advertising media server (advertising servers 226). Advertising media assets are media elements (media files) used in an advertisement, such as images, videos, flash games, etc. The advertising media server is a web application that is capable of delivering the advertising media assets, which are referenced by the advertising metadata by their retrieval location (such as a URL) within the advertising media server. The advertising media server can reside on any web server, collection of web servers, or a network (such as the content delivery network 224), and may or may not be on the same physical server as the advertising servers 226.

Once the advertising media assets have been loaded, the corresponding advertisement can be displayed to the user. How and when the advertisement manager 225 loads the advertising media assets and displays the advertisement varies based on the advertisement type, the calling application, the available space, and other factors. For example, if the available space is very small, the advertisement manager may choose not to display all of the advertising media assets for the advertisement or to reduce the font size, or if the calling application is a video player, the advertisement manager may choose not to display the advertisement until a certain amount of the video has been played. Likewise, based on the time of day, or the passed on data regarding the user's age, gender, location, etc., the advertising media assets might be varied.

As a result, the advertisement unit is not limited to the standard formats specified by the IAB, but rather can be dynamically sized and structured to work in any space provided. As shown in FIG. 5, the text 302, images 304, elements 306, and interaction prompt 308 of the advertisement unit 300 can be sized, arranged, altered, left out, or added to as needed to form an advertisement for any situation. Thus, an advertisement could be created for any standard sized advertisement unit as well as any non-standard size unit by having the advertising manager 225 decide what advertising media assets best fit within the space provided for the advertisement and then arrange those assets accordingly.

If there is very little space for the advertisement, then it may only be comprised of a line of text 302 (or just a word) and an interaction prompt 308 (which may be the word itself or some other visible or invisible element). For example, a crown unit (i.e., an advertisement which sits on top of other content) could be dynamically generated in a very constrained space that may only allow for a single word or line of text in a small font or a single image or graphic. With a little more space, it might be possible to add an image 304 or larger image. An even larger space could allow for a larger version of the same image 304, the text 302 in a bigger font, additional text, various elements, a video box, etc. Any of the advertising media assets of the advertisement unit could be dynamically refreshed once the advertisement was generated, or selected in some sort of dynamic fashion so that different users seeing the same advertisement at the same time might get different content/assets, or even the same user seeing an advertisement for the same thing might get different content/assets each time.

As noted above, any component of the advertisement specified by the XML file could also be dynamic. For example, any advertising media asset could be supported by an RSS feed, thereby enabling that asset to be frequently updated or modified. The advertisement manager 225 may also make subsequent (even frequent) requests to additional servers for dynamic advertising data, to replace content, or to implement extra functionality. For example, as illustrated in FIG. 12, if an advertisement is for a television show or game, the advertisement manager 225 may make a request to a server for the show's/game's air time in the user's time zone, which could then be displayed with the advertisement. Extra functionality, such as the ability to send an advertisement to a friend via email, might be accomplished by having the advertisement manager 225 contact an email server for processing the email, as illustrated in FIG. 9.

These various advertisements can also be constructed from reusable structural and/or advertising media asset components. For example, an animation used in a ticker advertisement (an advertisement shown in a ticker, i.e., a small area that overlays or obstructs content) for one advertiser could be used by the same advertiser in a different type of advertisement, or even a different advertiser for a different product/service. This can be accomplished by having multiple XML files specify the same media asset(s). These same media assets would then be downloaded from the advertising media server (i.e., content delivery network 224) for use in the different advertisements. Other types of advertisements that can be specified to the advertisement manager by the XML file include, without limitation:

a pre roll advertisement (i.e., an advertisement shown to the user before showing the content the user requested);
  a post roll advertisement (i.e., an advertisement shown after the user completes viewing the desired content);
  a mid roll advertisement (i.e., an advertisement shown in the middle of the desired content); and
  a menu advertisement (i.e., an advertisement show in an interface inside the video player where the user is selecting additional content or accessing additional functionality like emailing or embedding the player).

In addition to playing or helping to facilitate the presentation or playing of an advertisement, the advertisement manager 225 serves other purposes. The advertisement manager 225 can be used to track user events, such as each instance where the user pauses or plays the content, or when the content begins and ends. Thus, the advertisement manager 225 continues to control the advertising experience by managing the advertisement, running any animations or videos, checking for user interactions, and updating the advertisement as needed. The advertisement manager may also track certain events and send data on when or how the event occurred and send that information to an advertising data collection server for reporting or billing, as further described below.

The combination of the player 208 and appropriate coding with the advertisement servers 226, advertisement manager 225, and content delivery network 224 allows interactive advertisements to be provided to any websites that hosts a player 208 of any form. The present method and system also allows for advertisement to be structured, shaped and positioned in any manner that will invite a user to watch an advertiser's message.

Figure 13:
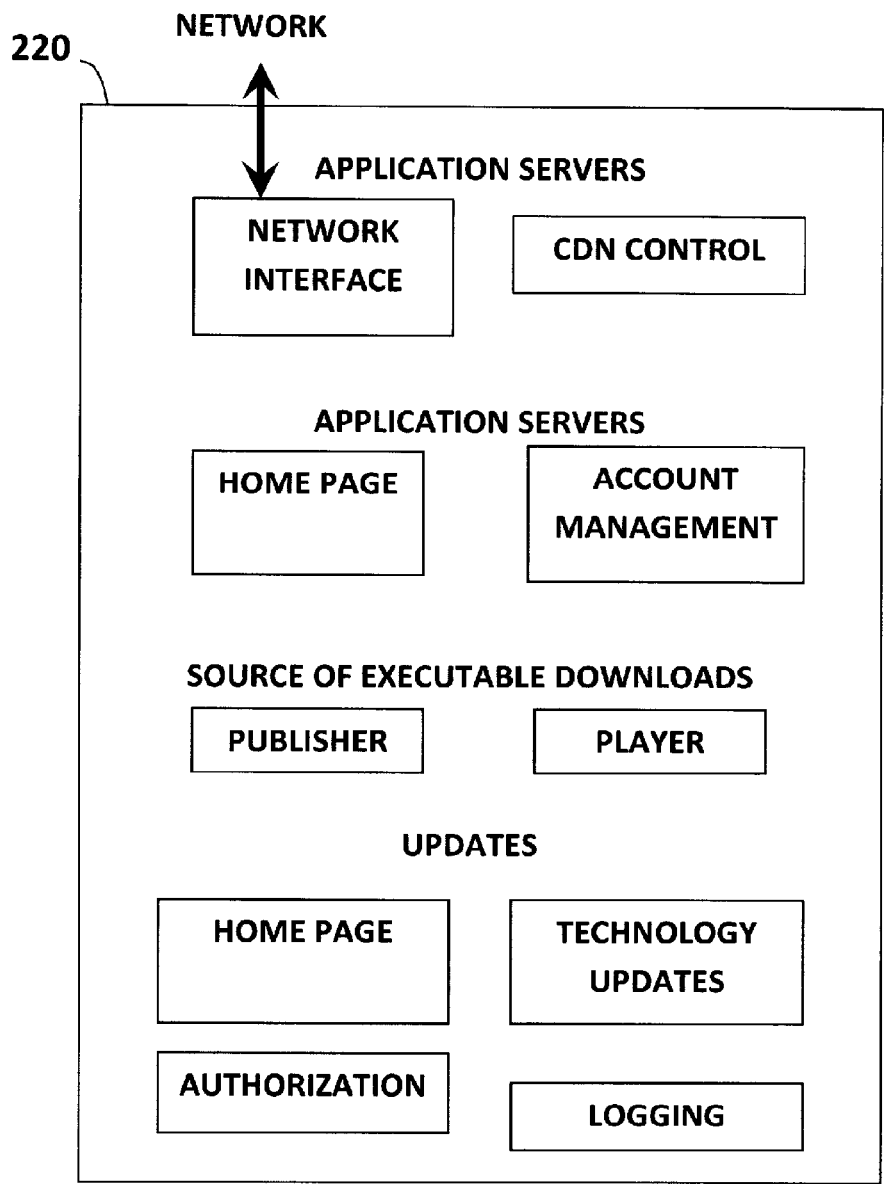
FIG. 13 depicts a block diagram of exemplary application servers of the present invention.

The remaining major component of FIG. 2 yet to be described in any detail is the application servers 220. FIG. 13 depicts a block diagram of an exemplary application server(s) 220, according to one embodiment. The application server(s) 220 may provide central control of certain system platform functions such as providing content delivery network 224 control, providing a central website for the publisher's home page, providing account management (including reporting server functions and collecting and storing data about users), providing a source of executable downloads for the player 208 browser plug-ins, providing automatic updates to player 208, providing logging of data flow and usage, providing authorization for use of the components of the system (such as uploading content to the content delivery network 224), providing other controls to facilitate the manipulation and viewing of content files, and providing the advertising data collection server. This latter server is a web application which collects engagement data. When a user interacts with a particular advertisement, the advertisement manager 225 notifies the advertising data collection server of the engagement, which in turns stores the data for future use. Data from the advertising data collection server can then be used to provide reports and to determine how much the advertiser should pay if the advertiser is paying on an engagement basis.

As noted in the Background of the Invention section, in the past, advertisers have been obligated to pay publishers for each advertisement primarily based on pay-per-impression (PPI) or pay-per-click (PPC) compensation models, even in the absence of any evidence that a user has paid any attention to the advertisements in question. Only paying publishers when a click through occurs (the other primary form of compensation), however, goes too far the other way in that it is not always reasonable or appropriate to expect a user to have to leave the website they are viewing to go to another website corresponding to the advertisement. The present invention provides an alternative to PPI and PPC compensation models without requiring click through as a compensation alternative. The present invention couples the engagement-based advertisement described above with a new compensation model that forces greater accountability on publishers and enables advertisers to more objectively measure the effectiveness of their advertisements.

In one embodiment, when a user engages or interacts with the displayed advertisement, such as by moving the cursor over the advertisement unit 500 or the interaction prompt 508 (or engaging in one of the other manners described above), the advertiser is assured that the user has seen the advertisement and paid some attention to it. Any act of engagement, and the level of such engagement (i.e., the "degree of engagement"), by a user can then be tracked and reported to determine appropriate compensation for a publisher. If the user's engagement is more than just passing, such as resulting in the advertisement becoming active, then the advertiser would be provided with an even higher level of assurance and the publisher might be paid an even higher amount of money because of the increased degree of engagement. The degree of engagement could also include different types of engagement and/or the amount of time spent by the user engaging the advertisement. For example, the passage of a mouse over the interaction prompt 508 might be paid at the lowest rate, while allowing the countdown to get to "2" or "1", but short of letting the advertisement become active, could be paid at a higher rate. Allowing the advertisement to become active would generate an even higher rate. A user's emailing or otherwise sharing of an advertisement could result in different revenue, including the resulting stream of additional viewers to whom the advertisement was sent or shared with, which could be tracked by the advertisement. A click through by the user to the advertiser's website might be compensated even higher. Likewise, a single user that uses the "next advertisement" feature to view multiple advertisements from the same advertiser could be priced at a different rate.

In an embodiment, rather than pay on a per user basis, engagements for multiple users over some period of time could be aggregated, with fees being based on aggregation totals or even percentages, e.g., 10,000 users moused over without further engagement, 5,000 partially counted down through the interaction prompt, 1,000 allowed the advertisement to become active, 500 clicked through, etc. Thus, many different means of tracking and reporting user engagement is possible and many different compensation schemes accordingly can result.

This engagement-based compensation model is more trustworthy than pay per impression-based models because user intent and interest in the advertisement is not inferred or assumed based on the mere display of an ad, but rather from true engagement with the advertisement-engagement being defined herein as interaction that falls short of a click-through. Further enhancements to the model include certain technological measures that avoid or account for "engagement" fraud that could be caused by manual or automated methods that appear to indicate engagement when no actual engagement by a user has occurred.

Potentially fraudulent activity includes engagements from known suspicious IP addresses or browser user agents, unusual engagement levels from particular users, unusual ratios of engagement types, unusual amounts of time between engagement types, etc. For example, if a user constantly starts, stops and restarts a video, or starts a video and immediately stops the video, that activity may be fraudulent. Likewise, if a particular IP address shows lots of mouse overs, but no video views, or 100% video views, fraud could also be suspected. When fraudulent activity is detected or suspected, the advertisement manager 225 could disable the advertisement so no further engagement is possible. Alternatively, if fraudulent engagement with an advertiser's advertisement is detected, any engagement accounting associated with that advertisement could be adjusted by the amount of fraud involved.

Likewise, the model could be further enhanced through the application of an advanced advertising marketplace that allows advertisers to bid on the amounts to be paid per engagement, measured engagement, different type of engagement, etc., in an auction environment. This type of advanced marketplace, when combined with the engagement model of the present invention, would allow advertisers to reach certain targeted demographics or other targeted criteria (such as noted above) with much greater levels of assurance and reliability than present models make possible. Under this model, advertisers are only obligated to pay when a user interacts with the displayed advertisement—not upon the mere display of the advertisement alone.

While the present invention has been illustrated and described herein in terms of a preferred embodiment and several alternatives associated with systems and methods for dynamic and engagement-based advertising and compensation, it is to be understood that the various components of the combination and the combination itself can have a multitude of additional uses and applications. Accordingly, the invention should not be limited to just the particular descriptions and various drawing figures contained in this specification that merely illustrate one or more preferred embodiments and applications of the principles of the invention.

We claim:

1. A computer-implemented method for compensating a publisher for engagement by a user with an advertisement associated with an advertiser and displayed on a computer, comprising the steps of:

determining whether the user has performed an action with the computer that indicates the user has interacted with the advertisement, the advertisement including an engagement warning displayed on the computer in response to the action, wherein the engagement warning informs the user that a further interaction with the advertisement will cause an additional advertisement asset to be displayed on the computer, wherein the additional advertisement asset is displayed after an expiration of the engagement warning;

measuring a degree of engagement based on the action, wherein the degree of engagement includes at least displaying the additional advertisement asset after the expiration of the engagement warning, and closing the engagement warning if the user stops interacting with the advertisement before expiration of the engagement warning; and compensating the publisher based on the degree of engagement.

2. The method of claim 1, wherein the action includes a movement by the user of a cursor controlled by the computer over a portion of the advertisement.

3. The method of claim 2, wherein the degree of engagement includes allowing a countdown to expire before the user moves the cursor from over the portion.

4. The method of claim 2, wherein the degree of engagement includes allowing the advertisement to expand from an invitation advertisement to a full advertisement.

5. The method of claim 2, wherein the degree of engagement includes the user clicking through the advertisement to access a website associated with the advertiser.

6. The method of claim 1, wherein the degree of engagement includes a period of time during which the user has continued to interact with the advertisement.

7. The method of claim 1, wherein the advertisement includes a share tool, wherein the degree of engagement includes using the share tool to enable the user to share the advertisement with a third party.

8. The method of claim 1, wherein the degree of engagement includes the user clicking through the advertisement to access a website associated with the advertiser.

9. The method of claim 1, wherein the degree of engagement includes the user selecting a next advertisement tool to view a different advertisement by the same advertiser.

10. The method of claim 1, wherein the degree of engagement includes one or more activities associated with the action and an amount of time spent by the user for each activity among the one or more activities.

11. The method of claim 1, wherein the degree of engagement includes allowing a countdown to expire before the user moves the cursor from over the portion.

12. The method of claim 1, wherein the degree of engagement includes allowing the advertisement to expand from an invitation advertisement to a full advertisement.

13. The method of claim 1, further comprising the step of aggregating the action and the degree of engagement of the user with a plurality of actions and degrees of engagement by a plurality of other users, and wherein the step of compensating includes compensating the publisher based on a proportion of the action and the degree of engagement by the user among the plurality of actions and degrees of engagement by the plurality of other users.

14. The method of claim 1, further comprising the step of detecting a fraudulent use of the advertisement by the user, and wherein the step of compensating includes reducing the degree of engagement by the fraudulent use.

15. The method of claim 1, wherein the step of compensating includes the step of determining a level of compensation for the publisher based on an amount the advertiser agreed to pay after an auction with a plurality of other advertisers.

16. The method of claim 15, where the amount is based on the action.

17. The method of claim 15, where the amount is based on the degree of engagement.

18. The method of claim 15, where the amount is based on a number of actions performed by the user with the advertisement.

19. A computer-implemented method for compensating a publisher for engagement by a user with an advertisement associated with an advertiser and displayed on a computer, comprising the steps of:

determining whether the user has performed one or more activities with the computer that indicates the user has interacted with the advertisement, the advertisement including an engagement warning displayed on the computer in response to the one or more activities, wherein the engagement warning informs the user that a further interaction with the advertisement will cause an additional advertisement asset to be displayed on the computer, wherein the additional advertisement asset is displayed after an expiration of the engagement warning;

measuring a degree of engagement based on the one or more activities and an amount of time spent by the user on each activity among the one or more activities, wherein the degree of engagement includes at least displaying the additional advertisement asset after the expiration of the engagement warning, and closing the engagement warning if the user stops interacting with the advertisement before expiration of the engagement warning; and compensating the publisher based on the degree of engagement.

20. The method of claim 19, wherein the one or more activities include a movement by the user of a cursor controlled by the computer over a portion of the advertisement.

21. The method of claim 20, wherein the degree of engagement includes allowing a countdown to expire before the user moves the cursor from over the portion.

22. The method of claim 20, wherein the degree of engagement includes allowing the advertisement to expand from an invitation advertisement to a full advertisement.

23. The method of claim 20, wherein the degree of engagement includes the user using the cursor to select a website associated with the advertiser.

24. The method of claim 19, wherein the advertisement includes a share tool, wherein the degree of engagement includes using the share tool to enable the user to share the advertisement with a third party.

25. The method of claim 19, wherein the degree of engagement includes the user using a cursor controlled by the computer to click through the advertisement to access a website associated with the advertiser.

26. The method of claim 19, wherein the degree of engagement includes the user selecting a next advertisement tool to view a different advertisement by the same advertiser.

27. The method of claim 19, wherein the degree of engagement includes allowing a countdown to expire before the user moves a cursor controlled by the computer from over the portion.

28. The method of claim 19, wherein the degree of engagement includes allowing the advertisement to expand from an invitation advertisement to a full advertisement.

29. The method of claim 19, further comprising the step of aggregating the one or more activities, the amount of time spent, and the degree of engagement of the user with a plurality of one or more activities, amounts of time spent, and degrees of engagement by a plurality of other users, and wherein the step of compensating includes compensating the publisher based on a proportion of the one or more activities, the amount of time spent, and the degree of engagement by the user among the plurality of one or more activities, amounts of time spent, and degrees of engagement by a plurality of other users.

30. The method of claim 19, further comprising the step of detecting a fraudulent use of the advertisement by the user, and wherein the step of compensating includes reducing the degree of engagement by the fraudulent use.

31. The method of claim 19, wherein the step of compensating includes the step of determining a level of compensation for the publisher based on an amount the advertiser agreed to pay after an auction with a plurality of other advertisers.

32. The method of claim 31, wherein the amount is based on the one or more activities.

33. The method of claim 31, wherein the amount is based on the amount of time.

34. The method of claim 31, wherein the amount is based on the degree of engagement.

35. The method of claim 31, wherein the amount is based on a number of one or more activities performed by the user with the advertisement.

\* \* \* \* \*